United States Patent [19]

Goodman

[11] Patent Number: 4,631,091

[45] Date of Patent: Dec. 23, 1986

[54] METHOD FOR IMPROVING THE DISPERSIBILITY OF ORGANOCLAYS

[75] Inventor: Howard Goodman, Cornwall, United Kingdom

[73] Assignee: English China Clays Lovering Pochin & Co. Ltd., St. Austell, England

[21] Appl. No.: 765,259

[22] Filed: Aug. 13, 1985

[51] Int. Cl.⁴ .................. C04B 14/00; C04B 33/00
[52] U.S. Cl. ........................ 106/308 N; 501/145; 501/148; 501/149; 106/309
[58] Field of Search .................. 501/145–149; 106/308, 309

[56] References Cited

U.S. PATENT DOCUMENTS 4,240,951 12/1980 Moll et al. ............... 106/308 N
4,412,018 10/1983 Finlayson et al. ........ 106/287.25
4,473,407 9/1984 Thompson et al. ........ 106/308 N

OTHER PUBLICATIONS

Chem. Abst. 71:105673r, Mitra, N. K., 1969.

*Primary Examiner*—Theodore Morris
*Attorney, Agent, or Firm*—Stefan J. Klauber

[57] ABSTRACT

An organoclay which is readily dispersible in an organic liquid composition, is prepared by suspending a smectite clay in water to form a fluid suspension; treating the suspension with a solution of an inorganic salt, the cation of which preferably has a valency of at least two, the concentration of the salt being such as to flocculate the smectite clay substantially completely; mixing the suspension of the flocculated smectite clay with a quaternary ammonium compound, at least one of the four alkyl groups of which has from 10 to 24 carbon atoms; and dewatering the resultant product.

10 Claims, No Drawings

METHOD FOR IMPROVING THE DISPERSIBILITY OF ORGANOCLAYS

BACKGROUND OF INVENTION

This invention relates generally to organoclays, and more specifically relates to a process for improving the ease of dispersion of organoclays in organic liquid compositions.

An organoclay is an organophilic cation-modified clay derived from a clay mineral, generally of the smectite group, for example a bentonite, montmorillonite, hectorite, saponite or the like, by replacing the inorganic exchangeable cations, generally alkali or alkaline earth metal cations, which occur in the natural clay mineral, by organic cations, each comprising at least one hydrocarbon radical which has sufficient carbon atoms to render the surface of the cation-exchanged clay hydrophobic.

Organoclays have been found to be very useful as thixotropic agents in organic media such as, for example, lubricating greases, oil-based drilling fluids, paints, varnishes, enamels and printing inks. However, an organoclay is, in general, difficult to disperse in an organic medium to form the uniform gel structure which is required to thicken, or to increase the viscosity of, the organic medium. Various means have accordingly been used to improve the dispersibility of an organoclay in an organic medium, including the use of a polar organic material, such as a low molecular weight alcohol or ketone, as a dispersing aid, and the use of an excess of a specially selected organic cation in the preparation of the organoclay.

In Finlayson et al, U.S. Pat. No. 4,105,578, an organophilic clay gellant having enhanced dispersibility in organic systems is disclosed which comprises the reaction product of a methyl benzyl dialkyl ammonium compound wherein the compound contains 20 to 35% alkyl groups having 16 carbon atoms, and 60 to 75% alkyl groups having 18 carbon atoms, and a smectite-type clay having a cation exchange capacity of at least 75 milliequivalents per 100 grams of said clay, and wherein the amount of said ammonium compound is from 100 to 120 milliequivalents per 100 grams of said clay, 100% active clay basis.

In Finlayson et al, U.S. Pat. No. 4,412,018, an organophilic clay gellant and methods of using and making same are disclosed, which comprises the reaction product of an organic cation, an organic anion and a smectite-type clay having a cation exchange capacity of at least 75 milliequivalents per 100 grams of said clay, such that an organic cation-organic anion complex is intercalated with the smectite-type clay and the cation exchange sites of the smectite-type clay are substituted with the organic cation.

In our co-pending application Ser. No. 727,022, filed Apr. 25, 1985, we have disclosed a method for treating an organoclay in order that it will disperse readily under low shear in an organic medium to form a homogeneous gel structure without the use of an additional polar organic material. According to such invention there is provided a process which comprises mixing an aqueous suspension of a smectite clay with a quaternary ammonium compound capable of rendering the smectite clay organophilic; subjecting the mixture to high shear mixing for a time sufficient to dissipate in the mixture at least 100 KJ of energy per kg. of dry solids in the mixture; and dewatering the product. The dewatered product is preferably then dried and milled.

The high shear mixing utilized in the invention of our said Ser. No. 727,022 application, is preferably effected by passing the suspension through a homogenizer of the type in which the suspension is forced in the form of a thin film edgewise through a thin, hard surfaced gap under pressure of at least 250 pounds per square inch (1.7 MPa) and at high velocity. A suitable homogenizer is described in British Patent Specification No. 987,176 (or in U.S. Pat. Nos. 3,039,703 and 3,162,379). Such a homogenizer is manufactured by the Manton-Gaulin Company. Advantageously the homogenizer is operated at a pressure of at least 1500 pounds per square inch (10.5 MPa). The amount of energy, in KJ per kg. of dry solids, dissipated in the mixture is given by the expression $$E = (nP \cdot 10^3)/w$$

where P is the pressure in MPa exerted in the Manton-Gaulin homogenizer, n is the number of passes through the Manton-Gaulin homogenizer, and w is the weight in grams of dry solids in 1 liter of the aqueous mixture.

While the process disclosed in our Ser. No. 727,022 application, accordingly yields highly effective results, the method necessitates use of the aforementioned high shear technology, which requires use of appropriate apparatus and expenditure of relatively large amounts of energy.

Pursuant to the foregoing, it may be regarded as an object of the present invention, to provide a method which while improving the ease of dispersibility of organoclays in organic liquid compositions, avoids the need to provide high shear mixing equipment and the expenditure of the large amounts of energy which are required for the high shear mixing.

SUMMARY OF INVENTION

Now in accordance with the present invention, an organoclay which is readily dispersible in an organic liquid composition, is prepared by a method comprising the following steps:

(a) A smectite clay is suspended in water to form a fluid suspension.

(b) The aqueous suspension of the smectite clay is treated with a solution of an inorganic salt, the cation of which preferably has a valency of at least two, the concentration of the salt being such as to flocculate the smectite clay substantially completely.

(c) The suspension of the flocculated smectite clay is mixed with a quaternary ammonium compound at least one of the four alkyl groups of which has from 10 to 24 carbon atoms; and (d) The product of step (c) is dewatered.

In step (b) the valency of the cation is preferably 3, and most preferably the cation is aluminum. If the valency of the cation is 3 the concentration of the solution of the salt containing the cation is preferably in the range of 0.002 M to 0.02 M. If, however, the valency of the cation is 2 the concentration of the solution of the salt containing the cation must be greater and is preferably in the range from about 0.2 M to 2 M.

The suspension of the flocculated clay is preferably mixed with the quaternary ammonium compound in proportions such that there are present from 95 to 140 milliequivalents of quaternary ammonium cation per 100 g of dry clay.

In step (c) the aqueous suspension of the flocculated smectite clay is preferably mixed with molten quaternary ammonium compound. The quaternary ammonium compound preferably has the general formula:

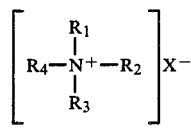

wherein $R_1$ is a saturated or unsaturated alkyl group having from 10 to 24 carbon atoms, $R_2$ and $R_3$, which may be the same or different, are each a saturated or unsaturated alkyl group having from 1 to 24 carbon atoms or an aralkyl group having from 7 to 10 carbon atoms, $R_4$ is an alkyl group having from 1 to 6 carbon atoms or an aralkyl group having from 7 to 10 carbon atoms, and X is OH, Cl, Br, I, $NO_2$, $CH_3SO_4$ or $CH_3.COO$.

Examples of such compounds are the benzyl methyl dialkyl ammonium chlorides, the dimethyl dialkyl ammonium chlorides, the benzyl dimethyl alkyl ammonium chlorides, the benzyl trialkyl ammonium chlorides and the methyl trialkyl ammonium chlorides, where the one or more alkyl group represents a mixture of hydrocarbon radicals derived from tallow having from 14 to 20 carbon atoms but in which $C_{18}$ radicals preferably predominate (a typical analysis of such a mixture of hydrocarbon radicals contained in tallow is: $C_{14}$ 2.0%; $C_{15}$ 0.5%; $C_{16}$ 19.0%; $C_{17}$ 1.5%; $C_{18}$ 66.0% and $C_{20}$ 1.0%). The hydrocarbon radicals may be partially unsaturated as in natural tallow or may be substantially completely saturated as a result of treating the tallow with hydrogen in the presence of a suitable catalyst.

DESCRIPTION OF PREFERRED EMBODIMENTS

Practice of the present invention will now be illustrated by the following Examples, which however, are to be considered as merely illustrative of the invention, and not delimitive thereof:

EXAMPLE I

Organoclay samples were prepared by the following method:

In each case, an aqueous suspension of bentonite was prepared by mixing raw Wyoming sodium bentonite in a blunger with sufficient water to form a suspension containing 10% by weight of dry clay. The suspension thus formed was passed through a No. 300 mesh British Standard sieve (nominal aperture 0.053 mm) and the undersize fraction was diluted to about 6% by weight of solids with water and subjected to a particle size separation in an intermittent discharge, continuous centrifuge at a flow rate of 1 liter per minute. The fine fraction was then passed through an homogenizer as a pre-treatment to reduce particle size and increase uniformity. To a 500 g sample of the homogenized fine fraction, there was then added 120 g of a solution containing the calculated weight of either aluminum sulfate ($Al_2(SO_4)_3.18\ H_2O$) or aluminum chloride ($AlCl_3.6H_2O$) which was required to give the desired concentration of aluminum sulfate in 620 g of the suspension. The suspension was then subjected to stirring by means of a paddle mixer for 30 minutes while the suspension was heated to a temperature of 65° C.

There was then added to the heated suspension the calculated weight of a mixture of quaternary ammonium compound and water and isopropyl alcohol (in which form the quaternary ammonium compound is available in commerce) which was required to give the desired loading of quaternary ammonium compound on dry bentonite. The resultant mixture was then stirred in the paddle mixer for 30 minutes, filtered on a Buchner funnel, washed with hot water and dried for 16 hours at 60° C. in an air-swept oven. The dry product was then milled to pass through a sieve of nominal aperture 0.080 mm.

Various organoclays were prepared according to the above procedure using as the quaternary ammonium compound either dimethyl di(hydrogenated tallow) ammonium chloride (2M2HT) or methyl benzyl di(hydrogenated tallow) ammonium chloride (MB2HT), different concentrations of aluminum sulfate being used in the preparation of the aqueous suspension of bentonite.

Each organoclay was incorporated into an alkyd gloss paint composition which was prepared in the following manner. The following ingredients were first mixed together in the stated proportions by weight:

| Ingredient | Wt. % |
|---|---|
| Alkyd resin | 20.0 |
| White spirit | 8.25 |
| Calcium naphthenate | 0.9 |
| Titanium dioxide | 29.8 |
| Methylethyl ketoxime | 0.2 |

When the above composition was thoroughly mixed the following materials were added under stirring in the following order:

| Ingredient | Wt. % |
|---|---|
| Alkyd resin | 33.0 |
| White spirit | 6.25 |
| Lead naphthenate | 0.8 |
| Cobalt naphthenate | 0.3 |
| Organoclay | 0.5 |
| Total | 100.0% |

The calcium, lead and cobalt naphthenate are drying agents and the methylethyl ketoxime is an anti-skin agent.

Each paint composition was mixed for 15 minutes using a Cowles blade of diameter 41 mm rotating at a speed of 2500 rpm. At the end of this time small samples were taken on a spatula and spread on a Hegman gauge. The size of the largest solid particles present in a significant proportion was read from a Hegman gauge.

The said Hegman Gauge is used to determine the quality of the dispersion of solid particles in an organic liquid medium, and comprises a polished metal plate provided with a rectangular depression of tapering depth which varies uniformly from zero at one end to 100 mm at the other end. A film of the organic liquid composition is spread evenly over the plate and a visual estimate of the coarsest particles present in the composition can be made.

If a substantial number of relatively coarse (10–100 micrometer) particles are present in the composition a definite "front" will be observed which, when compared with a scale provided alongside the depression, indicates the size of the largest particles present. If only a few particles in the above size range are present these will show up as specks in the depression and may be counted. The particulate solid material in a paint composition should be dispersed to such an extent that no front is visible when a sample of the paint is spread on a Hegman gauge and only a very small number, if any, specks can be seen.

Larger samples of the complete alkyd gloss paint compositions were allowed to stand for 24 hours and were then tested for viscosity at 21° C. using a Brookfield Viscometer fitted with spindle No. 2 at 1 rpm. A sample of an alkyd gloss paint composition prepared in an identical manner but containing no organoclay was also tested for viscosity in the same way.

For each sample of organoclay a "viscosity ratio" at 1 rpm was calculated according to the following formula:

Viscosity ratio =

$$\frac{\text{viscosity at 1 rpm of paint composition with organoclay}}{\text{viscosity at 1 rpm of paint composition without organoclay}}$$

The results are set forth in Table I below:

TABLE I

| Quaternary Ammonium Compound | Milli-Equivalents Quaternary Ammonium Compound per 100 g clay | Concentration of Al$^{3+}$ ions in Aqueous Suspension (M) | Viscosity ratio at 1 rpm | Gauge Size of Largest Particles (μm) |
| --- | --- | --- | --- | --- |
| 2M2HT* | 132 | 0.001 | 3.8 | 70 |
| 2M2HT | 132 | 0.005 | 3.6 | 40 |
| 2M2HT | 132 | 0.01 | 2.7 | 10 |
| 2M2HT | 132 | 0.02 | n.d. | 10 |
| 2M2HT | 132 | 0.05 | 2.9 | 20 |
| MB2HT** | 122 | 0.001 | n.d. | 80 |
| MB2HT | 122 | 0.0025 | 5.7 | 10 |
| MB2HT | 122 | 0.005 | 4.8 | 10 |
| MB2HT | 122 | 0.0075 | 4.1 | 10 |
| MB2HT | 122 | 0.01 | 3.3 | 10 |

*dimethyl dihydrogenated tallow
**methyl benzyl dihydrogenated tallow

EXAMPLE II

Further samples of organoclays were prepared according to the procedure described in Example I with different loadings of 2M2HT or MB2HT being used in each case. The concentration of aluminum sulfate in the aqueous suspension of bentonite was 0.01 M for each sample containing 2M2HT, and 0.005M for each sample containing MB2HT. Each organoclay was incorporated into an alkyd gloss paint composition having the same formulation as that in Example I, and each completed paint composition was tested on a Hegman Gauge for the size of the largest solid particles present in a significant proportion.

The results are set forth in Table 2 below:

TABLE 2

| Quaternary Ammonium Compound | Milli-Equivalents Quaternary Ammonium Compound per 100 g clay | Concentration of Al$^{3+}$ ions in Aqueous Suspension (M) | Hegman Gauge Size of Largest Particles (μm) |
| --- | --- | --- | --- |
| 2M2HT | 104 | 0.01 | 40 |
| 2M2HT | 115 | 0.01 | 25 |
| 2M2HT | 124.5 | 0.01 | 15 |
| 2M2HT | 131.5 | 0.01 | 10 |
| 2M2HT | 132 | 0.01 | 10 |
| 2M2HT | 134 | 0.01 | 5 |
| 2M2HT | 137 | 0.01 | 5 |
| MB2HT | 102.5 | 0.005 | 70 |
| MB2HT | 103 | 0.005 | 70 |
| MB2HT | 114 | 0.005 | 80 |
| MB2HT | 115 | 0.005 | 60 |
| MB2HT | 122 | 0.005 | 10 |
| MB2HT | 123 | 0.005 | 5 |
| MB2HT | 123.5 | 0.005 | 10 |
| MB2HT | 124 | 0.005 | 10 |
| MB2HT | 135 | 0.005 | 10 |

EXAMPLE III

Further organoclay samples were prepared according to the procedure described in Example I, except that the time for which the mixture of the suspension of the fine bentonite from the centrifuge and the solution of aluminum sulfate was stirred in the paddle mixer was different in each case. In each case there was used 135 meq. of MB2HT per 100 g of dry bentonite, and the concentration of aluminum ions in the aqueous suspension was 0.01 M.

Each organoclay was incorporated into an alkyd gloss paint composition having the same formulation as that in Example I, and each completed paint composition was tested on a Hegman gauge for the size of the largest solid particles present in a significant proportion. Larger samples of each paint composition were also allowed to stand for 24 hours and were then tested for viscosity at 21° C. using a Brookfield Viscometer fitted with spindle No. 2 at speeds of 1 rpm, 5 rpm and 50 rpm respectively.

A sample of the same paint composition, but containing no organoclay was also tested in the same way.

The results are set forth in Table 3 below:

TABLE 3

| Concentration of $Al^{3+}$ ions in Aqueous Suspension (M) | Mixing Time (min) | Hegman Gauge Size of Largest Particles (μm) | Viscosity (mPa · s) at 21° C. at | | |
|---|---|---|---|---|---|
| | | | 1 rpm | 5 rpm | 50 rpm |
| 0.01 | 7 | 20 | 2480 | 1640 | 960 |
| 0.01 | 15 | 5 | 3040 | 1920 | 1000 |
| 0.01 | 30 | 5 | n.d. | n.d | n.d. |
| 0.01 | 60 | 5 | 2640 | 1680 | 960 |
| Paint Composition Without Organoclay | | 5 | 560 | 584 | 578 |

EXAMPLE IV

In this Example, a series of further organoclay samples were prepared utilizing the procedure of Example I, except that various salts—both with monovalent and multivalent cations—were utilized. More specifically the salts utilized included sodium chloride, lithium chloride, ammonium chloride, calcium chloride, magnesium chloride, ferric chloride and chromium chloride. Various concentrations of the said salt solutions were utilized in accordance with the showing of Table 4. Each resultant organoclay was incorporated into an alkyd gloss paint composition having the same formulation as that in Example I, and each completed paint composition was tested on a Hegman Gauge for the size of the largest solid particles present in a significant proportion. The larger samples of each paint composition were also allowed to stand for 24 hours and were then tested for viscosity at 21° C. using a Brookfield viscometer fitted with a No. 2 spindle at speeds of 1 rpm. The results are set forth in Table 4, which establishes that with monovalent salts, e.g., sodium chloride, or with divalent salts, e.g., calcium chloride, considerably higher concentrations are needed for Hegman dispersion. (It is found that with monovalent salts approximately a 2 to 10 M solution is required). Conversely, when the trivalent aluminum or chromium +3 ion is employed, much lower concentrations are required. While with chromium +3 ion good dispersion is obtained, chromium +3 ion is generally more expensive to utilize than aluminum ion and additionally chromium is less desirable to employ for practical reasons, in that chromium ion can under some conditions be a source of industrial pollution.

TABLE 4

| Salt | Concentration (M) | Amine (130 meq/100 g) | Hegman Gauge After 15 min. (largest particles μm) | Viscosity at 1 rpm after 24 hrs (cp) | Viscosity blank paint (cp) |
|---|---|---|---|---|---|
| NaCl | 2 | 2M2HT | 3 (60) | 3280 | 960 |
| LiCl | 2 | 2M2HT | 3 (60) | 3000 | 800 |
| NH₄Cl | 2 | 2M2HT | 3 (60) | 2480 | 800 |
| CaCl₂ | 0.3 | 2M2HT | 7 (10) | 2000 | 600 |
| | 0.5 | 2M2HT | 7 (10) | 3040 | 840 |
| | 1.0 | 2M2HT | 6 (25) | 2440 | 840 |
| MgCl₂ | 0.5 | 2M2HT | 4½ (40) | 3680 | 800 |
| | 1 | 2M2HT | 7 (10) | 1880 | 600 |
| | 2 | MB2HT | 7 (10) | 3400 | 880 |
| FeCl₃ | 0.05 | 2M2HT | 5½ (30) | 2680 | 1000 |
| | 0.1 | 2M2HT | 4 (50) | 2640 | 1000 |
| | 0.2 | 2M2HT | 5 (40) | 2760 | 1000 |
| CrCl₃ | 0.05 | 2M2HT | 7 (10) | — | — |
| | 0.1 | 2M2HT | 7 (10) | 3040 | 1000 |
| | 0.2 | 2M2HT | 7 (10) | 2800 | 1000 |

While the present invention has been particularly set forth in terms of specific embodiments thereof, it will be understood in view of the instant disclosure that numerous variations upon the invention are now enabled to those skilled in the art. Which variations yet reside within the scope of the present teaching, accordingly the invention is to be broadly construed and limited only by the scope and spirit of the claims now appended hereto.

We claim:

1. A process for preparing an organoclay which is readily dispersible in an organic liquid medium, comprising the steps of:
   (a) suspending a smectite clay in water to form an aqueous suspension;
   (b) treating said aqueous suspension of the smectite clay with a solution of an inorganic salt wherein the cation of said inorganic salt has a valency of at least 2, the concentration of the salt being such as to flocculate the smectite clay substantially completely;
   (c) mixing the suspension of the flocculated smectite clay with a quaternary ammonium compound at least one of the four alkyl groups of which has from 10 to 24 carbon atoms; and
   (c) dewatering the product of step (c).

2. A process according to claim 1, wherein the smectite clay is mixed with the quaternary ammonium compound in proportions such that there are present from 95 to 140 milliequivalents of quaternary ammonium cation per 100 g of dry clay.

3. A process in accordance with claim 1, wherein the valency of said cation is 3.

4. A process in accordance with claim 3, wherein said cation is aluminum.

5. A process in accordance with claim 3, wherein the concentration of the solution of the salt containing the cation is in the range of 0.002 M to 0.02 M.

6. A process in accordance with claim 1, wherein the valency of said cation is 2, and wherein the concentration of the solution of the salt containing the cation is in the range of from about 0.2 M to 2 M.

7. A process according to claim 1, wherein the dewatered product of step (c) is dried and milled.

8. A process according to claim 1, wherein the quaternary ammonium compound mixed with the aqueous suspension of the smectite clay is molten.

9. A process according to claim 1, wherein the quaternary ammonium compound can be represented by the general formula:

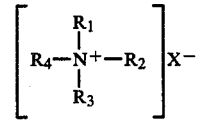

wherein $R_1$ is selected from saturated and unsaturated alkyl groups having from 10 to 24 carbon atoms, $R_2$ and $R_3$, which may be the same or different, are each selected from saturated and unsaturated alkyl groups having from 1 to 24 carbon atoms and aralkyl groups having from 7 to 10 carbon atoms, $R_4$ is selected from alkyl groups having from 1 to 6 carbon atoms and aralkyl groups having from 7 to 10 carbon atoms, and X is selected from OH, Cl, Br, I, $NO_2$, $CH_3SO_4$ and $CH_3.COO$.

10. A process according to claim 9, wherein the quaternary ammonium compound is selected from the group consisting of benzyl methyl dialkyl ammonium chlorides, dimethyl dialkyl ammonium chlorides, benzyl dimethyl alkyl ammonium chlorides, benzyl trialkyl ammonium chlorides and methyl trialkyl ammonium chlorides in which the one or more alkyl group represents a mixture of hydrocarbon radicals derived from tallow having from 14 to 20 carbon atoms.

* * * * *

UNITED STATES PATENT AND TRADEMARK OFFICE
CERTIFICATE OF CORRECTION

PATENT NO. : 4,631,091
DATED : December 23, 1986
INVENTOR(S) : Howard Goodman

It is certified that error appears in the above-identified patent and that said Letters Patent are hereby corrected as shown below:

In column 4, line 60, change "mm" to -- $\mu$m --.

Signed and Sealed this

Twenty-first Day of April, 1987

Attest:

DONALD J. QUIGG

*Attesting Officer*  *Commissioner of Patents and Trademarks*